May 22, 1962     L. PÉRAS     3,035,455
AUTOMATIC TRANSMISSION MECHANISMS
INCORPORATING TORQUE CONVERTERS
Filed April 13, 1959     4 Sheets-Sheet 3
Fig. 3
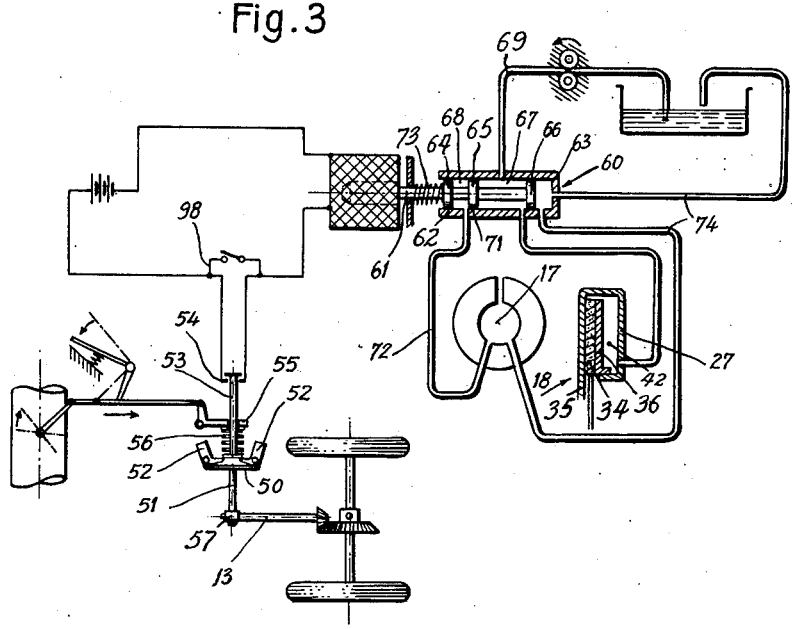
Fig. 4
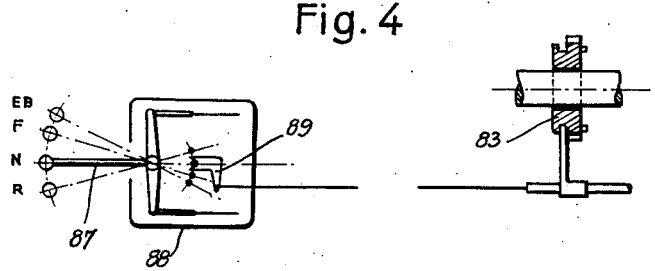
Fig. 5
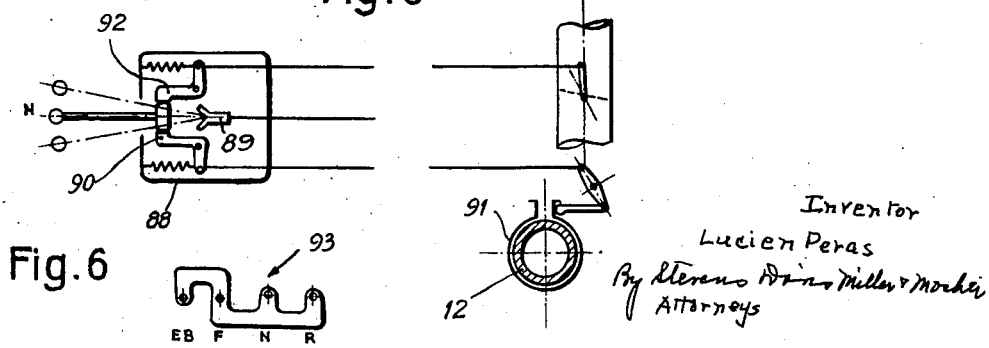
Fig. 6
Inventor
Lucien Peras
By Stevens, Davis, Miller & Mosher
Attorneys

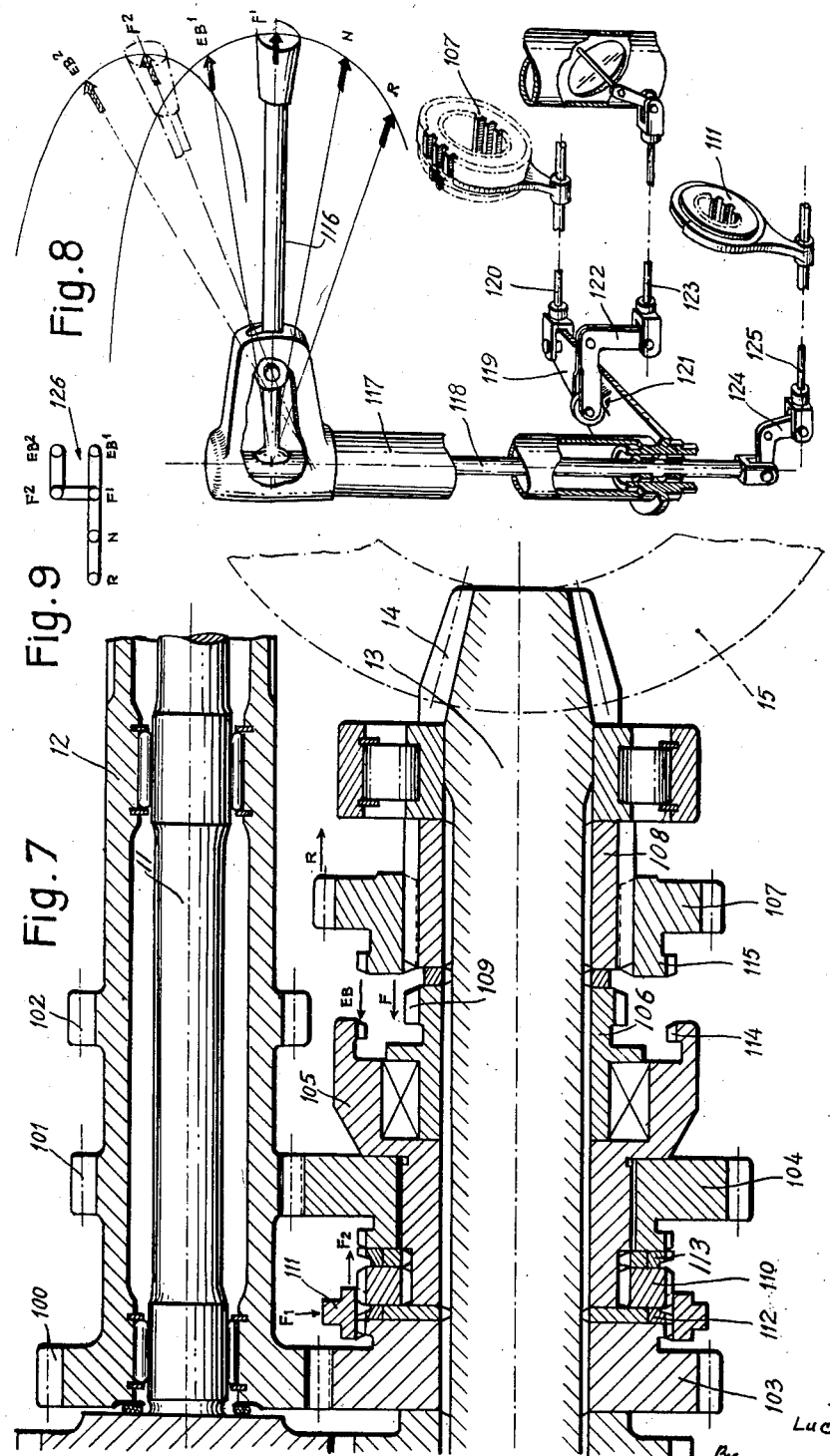

United States Patent Office
3,035,455
Patented May 22, 1962

3,035,455
AUTOMATIC TRANSMISSION MECHANISMS INCORPORATING TORQUE CONVERTERS
Lucien Péras, Billancourt, France, assignor to Regie Nationale des Usines Renault, Billancourt, France
Filed Apr. 13, 1959, Ser. No. 806,105
Claims priority, application France Apr. 14, 1958
9 Claims. (Cl. 74—645)

This invention relates to transmission mechanisms of automotive vehicles and has specific reference to transmissions of the hydraulic type. It is the essential object of this invention to provide a transmission mechanism or gearbox consisting of the following elements:

(1) A first hydraulic unitary assembly comprising mainly a hydrokinetic torque converter and a hydraulically controlled friction clutch connected through a centrifugal clutch to the engine according to a known arrangement.

(2) A second mechanical unitary assembly comprising mainly an automatically-controlled change-speed gear having parallel input and output shafts, the driven and driving ends of these shafts being located on the same side.

(3) A third mechanical unitary assembly comprising mainly a conventional-type differential gear driving the road wheels of the vehicle.

This invention is concerned more particularly, in a transmission of this character, with the following relative arrangement of the aforesaid three assemblies: disposed on one side of the differential gear (3) is the mechanical automatically-controlled change-speed gear (2), the unitary hydraulic assembly (1) and the engine being disposed on the other side.

The advantages resulting from the combination into a single unit of the engine and transmission mechanisms in vehicles having this unit disposed either at the front (with front drive) or at the rear (with rear drive) are already known to automotive engineers.

It is a specific object of this invention to provide in a relatively reduced volume a self-contained unit comprising the aforesaid assemblies or mechanisms wherein a completely automatic transmission with hydrokinetic torque converter is substituted for the conventional change-speed gear with hand-lever control or servocontrol.

Other features and advantages of this arrangement and of the specific component elements of the automatic change-speed transmission and of its control members according to this invention will appear as the following description proceeds with reference to the attached drawings forming part of this specification and illustrating diagrammatically by way of example two typical forms of embodiment of the invention. In the drawings:

FIGURE 3 is an explanatory diagram illustrating the arrangement and operation of the automatic control system;

FIGURES 4 and 5 are a longitudinal diagrammatic view and a transverse diagrammatic view, respectively, of the case enclosing the mechanical control means associated with the change-speed transmission mechanism, the relevant control linkage being also illustrated;

FIGURE 6 is a diagrammatic view of the grid for guiding the gear-change lever of the mechanism illustrated in FIGS. 4 and 5;

FIGURE 7 is a longitudinal sectional view showing another form of embodiment of a mechanical change-speed gear adapted to be substituted for the transmission mechanism of FIG. 1;

FIGURE 8 is a perspective view showing the mechanical gear-change lever arrangement for controlling the transmission of FIG. 7; and FIGURE 9 is a diagrammatic view showing the grid for guiding the gear-change lever of the mechanism illustrated in FIG. 8.

Figure 1:
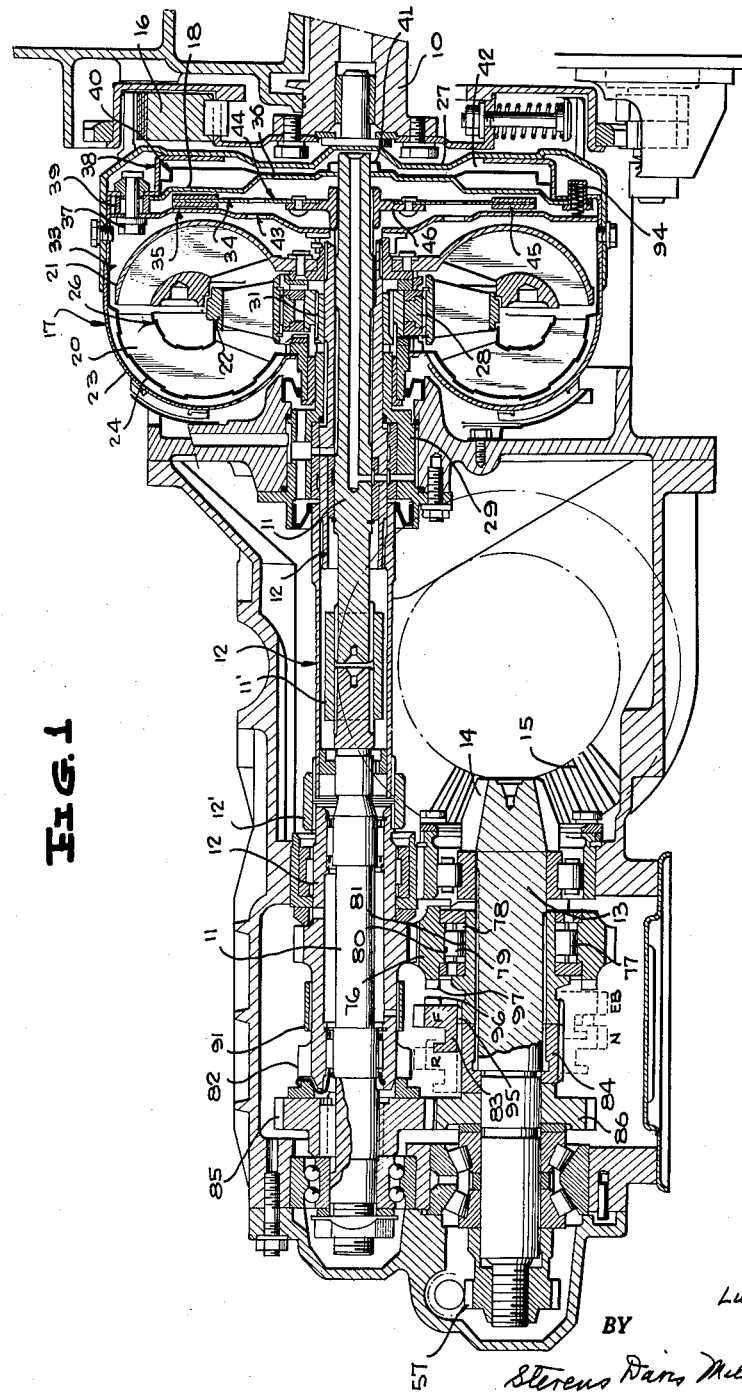
FIGURE 1 is a longitudinal section showing a transmission mechanism constructed according to the teachings of this invention.

Referring first to FIG. 1 of the drawings, it will be noted that the aligned shaft assembly of the change-speed transmission illustrated therein comprises an input shaft 10 connected to the engine, a first intermediate shaft 11 divided into two halves interconnected by a splined socket 11$^1$, a second hollow intermediate shaft 12 divided into three parts drivingly connected at 12$^1$ by splined sockets, as well as a counter-shaft 13 parallel to the preceding shafts and carrying a driving pinion 14 of a conventional-type differential 15 drivingly connected in turn to the road wheels of the vehicle.

The transmission comprises generally on one side of the differential (which corresponds to the input side of the change-speed gear) a centrifugal clutch 16 interposed between the engine shaft 10 and the input member of a hydrokinetic torque converter 17 of which the output member is connected to the intermediate shaft 12, as well as a friction clutch 18 responsive to hydraulic control means and adapted under certain conditions to be explained presently to connect the input member of the torque converter to the intermediate shaft 11.

Disposed on the other side of the differential gear is the mechanical transmission and from the foregoing it is already clear that with the assistance of an automatic control arrangement to be described presently the engine torque can be transmitted to the road wheels in the two manners set forth hereafter:

Transmission and transformation of the engine torque passing through the converter 17 and shaft 12 which may be connected through reducing gears to the output shaft 13, with or without the interposition of reversing gears to provide the reverse drive.

Direct transmission of engine torque by operating the friction clutch 18 short-circuiting the converter and therefore via the central shaft 11 of which the other end projecting from shaft 12 is connected to the output shaft 13 through the medium of a train of reducing gears 19 providing a reduction ratio lower than those cited in the preceding paragraph, these reducing gears 19 acting if desired only as simple counter-gears.

The centrifugal clutch 16 consists in the known manner of inertia weights carrying friction linings; these inertia weights are fulcrumed on separate pivot pins and urged to their disengaged position by springs acting upon the heels of said weights.

The hydrokinetic torque converter 17 is of the conventional three-element type. It comprises essentially an impeller 20, a turbine 21 and a reaction member 22. The impeller 20 comprises on the one hand a first outer casing 23 solid with another casing 24 carrying vanes 25 secured internally of the casing by any suitable means, and on the other hand an inner wall 26 contacting the inner edges of vanes 25; the outer casing 23 is connected to a driving casing 27. The turbine 21 is shown in the figure as consisting of light alloy but if desired it may be made of pressed sheet metal elements according to a technique applied to the construction of the impeller 20; this turbine 21 comprises an outer wall, suitably shaped vanes and an inner core. The reaction member 22 also shown as consisting of light alloy comprises an inner wall, suitably shaped vanes and an outer wall.

A freewheel device 28 acting as a unidirectional brake is provided between the reaction member 22 and its fixed support 29. The freewheel device 28 in the embodiment illustrated comprises a plurality of wedging members 30 disposed between the surfaces of inner and outer races 31 and 32 respectively. The outer race 32 is rigid with the reaction member 22 and the inner race 31 consists of an annulus rigid with the fixed support 29. The casing 23 and the driving casing 27 associated therewith constitute a chamber 33 adapted to be filled with a fluid under pressure. The operation of this type of converter is well known to specialists and it may be sufficient to observe that it receives on its turbine shaft a torque varying automatically with the speed of this shaft. In the assembly described hereabove and shown in the figure the turbine 21 of the torque converter is connected through a splined hub to the hollow shaft 12.

The friction clutch 18 is housed in the chamber 33 of the converter and comprises essentially a friction disc 34 adapted to be clamped between a pressure plate 35 held against axial and radial movement in relation to the driving casing 27 and a piston 36 radially solid with this driving casing 27 but axially displaceable in relation thereto. The pressure plate 35 is secured to the driving casing 27 by means of screws 37. The driving casing 27 is formed with a cylindrical inner surface 38 on which the piston 36 is adapted to slide in the axial direction. This piston is held against radial movement in the driving casing by distance-pieces 39 secured by screws 37. It carries on the one hand a packing 40 sliding on the aforesaid surface 38 and is formed on the other hand with a central aperture provided with a shaft packing 41 through which extends the shaft 11, thus forming within the chamber 33 an auxiliary sealed chamber 42 of variable capacity. In the pressure plate 35 and clutch disc 34 holes 43, 44 respectively are formed to permit the free passage of fluid between the torque converter zone and the entire portion of chamber 33 which is bound by the piston 36. The clutch disk 34 is provided with suitable friction linings 45 and connected through a splined hub 46 to the shaft 11.

Figure 2:
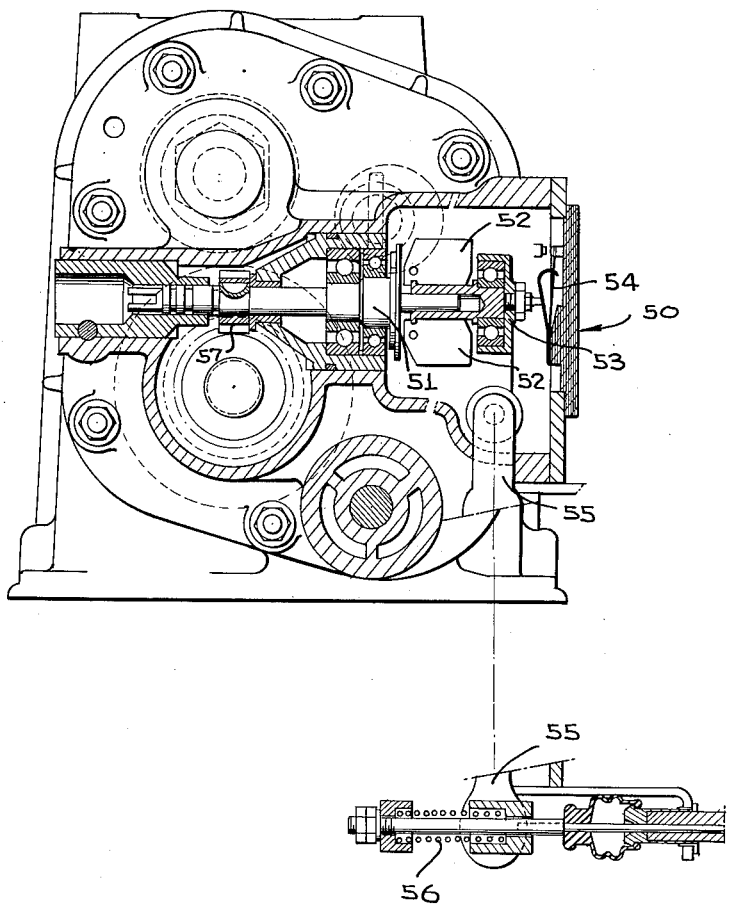
FIGURE 2 is a cross-section of the transmission mechanism which is taken upon the axis of the regulator or governor forming an integral part of the automatic control system.

In FIG. 2 there is shown a regulator 50 for automatically controlling an electromagnetic valve inserted in the hydraulic control circuit leading to the converter 17 and clutch 18, as will be explained presently. This regulator 50 is of a known type and comprises a driving shaft 51, inertia weights 52, a push member 53 acting upon a micro-switch 54, and a lever 55 connected to the throttle control member through the medium of a spring 56. The driving shaft 51 is driven in turn through a gear couple 57 providing a perpendicular drive from the counter-shaft 13.

Referring now to FIG. 3, this diagram illustrates the hydraulic control of the transmission mechanism which comprises the aforesaid electromagnetic valve responsive to the centrifugal regulator 50.

The electromagnetic valve 60 consists of a plunger-type solenoid and of a piston 61 connected directly to the solenoid core. This piston 61 is mounted for sliding movement in a cylindrical sleeve 62 carried by a valve body 63. The cylindrical bearing portions 64, 65 and 66 of this piston divide the cylinder into chambers 67 and 68. In the position shown in the figure, the valve provides a direct communication between the pipe lines 69 and 70. Pipe line 69 supplies fluid under pressure from an oil pump, for example the oil pump of the vehicle engine. Pipe line 70 provides a direct communication with the friction clutch 18 and permits the supply of fluid under pressure to the auxiliary space 42 formed between the driving casing 27 and the piston 36; in this case, the fluid will cause the clutch disc 34 to be clamped between the plate 35 and piston 36.

In the cylindrical bearing portion 65 of piston 61 a slot 71 of relatively reduced cross-section permits the passage of a small stream of fluid under relatively low pressure into the pipe line 72 leading to the converter 17 under the conditions of operation illustrated in the figure (clutch 18 in the engaged position). When the solenoid is energized its plunger core causes the piston 61 to move to the left as seen in FIG. 3 and compresses a return spring 73. In this position, the piston provides a direct communication between pipe lines 69 and 72, thus supplying fluid under pressure to the torque converter 17 and relieving the pressure from the other line 70 through the medium of the return line 74 leading to a reservoir.

In the form of embodiment of the invention which is illustrated in FIG. 1, the mechanical transmission comprises a first train of gears providing the forward drive and consisting of a gear 75 solid with the hollow shaft 12, a gear 76 in constant meshing engagement with gear 75, a free wheel or like unidirectional coupling 77 of adequate design being interposed between the gear 76 and a sleeve 78 carried by the shaft 13. The freewheel device 77, in the form of embodiment shown in the drawings, comprises a plurality of wedging members 79 disposed between races 80, 81 formed on the gear 76 and sleeve 78 respectively. This sleeve is mounted for free rotational motion on the counter-shaft 13.

The reverse gear train comprises a gear 82 fast with the hollow shaft 12 and in constant meshing engagement with an intermediate gear (not shown). Co-acting with the aforesaid two trains of gears is a sliding gear 83 rotatably connected through splines to a supporting sleeve 84 mounted in turn by means of splines on the counter-shaft 13. This sliding gear 83 is adapted to slide axially on the splines of sleeve 84 and may actually take a plurality of well-defined positions under the control of an external control member.

The gear train 19 constitutes another train of forward drive gears comprising a gear 85 solid with the intermediate shaft 11 and a gear 86 in permanent meshing engagement with pinion 85 and rotatably fast with the counter-shaft 13 through the medium of a permanent coupling with the sleeve 84.

FIGURES 4 to 6 of the drawings illustrate an external mechanical arrangement, suitable for controlling a change-speed transmission provided with this mechanical gearbox.

A gear-shift lever 87 placed in the vicinity of the steering wheel of the vehicle is connected to the sliding gear 83 of the transmission. In a case 88 a plurality of bell-crank levers are arranged as follows: A first bell-crank 89 operatively connected to the fork controlling the movements of the sliding gear 83; another bell-crank 90 controlling the operation of a band brake 91 mounted on the hollow shaft 12, the function of this brake (which may be obtained by other means if desired) being explained presently; and a bell-crank 92 connecting the gear-change lever to the throttle control lever through an adequate linkage. The gear control lever 87 actuates these different bell-crank levers and is adapted to occupy any one of the four following positions: neutral (N), reverse (R), forward drive (F), forward drive with engine braking effect (FEB) as indicated in the figures. The path in which this lever 87 may be shifted to these different positions is defined by a suitably shaped grid 93.

The transmission described hereabove operates as follows:

Assuming the vehicle to be still with the gear shift lever 87 in the neutral position (N), the driver may start the engine and accelerate same in the usual manner, without causing any torque to be transmitted to the road wheels. As a matter of fact, immediately as the ignition contact is established, the solenoid of the electromagnetic valve 60 attracts the piston 61 to the left (as seen in FIG. 3). This piston will thus permit a direct communication between the pipe line 69 supplying fluid under pressure and the torque converter feed line 72. The pipe line 70 on the other hand connects the clutch 18 to the atmosphere, and the pressure prevailing in the torque converter, in conjunction with the action of springs 94, will disengage the clutch disc 34 while moving the piston 36 to its extreme right-hand position (thus connecting the chamber 42 to the atmosphere).

Moreover, as long as the engine is idling, the centrifugal throttle 16 will not cause the rotation of the casing 27 fast with the assembly consisting of the torque converter 17 and clutch 18. Consequently, both shafts 11 and 12 will remain stationary. Under these conditions the driver may shift the gear change lever 87 to the forward (F) position or to the reverse (R) position by moving the sliding gear 83 from its neutral (N) position either to the right (FIG. 1), thus causing the splines of the sliding gear 83 to engage the teeth 95 of sleeve 78, or to the left, thus causing the gear 83 to mesh with the intermediate reverse idler gear, respectively, without occasioning any shocks or jerks.

This last-mentioned feature is characteristic of the provision of a centrifugal clutch 16 between the engine and the torque converter 17.

Nevertheless, in this form of embodiment the brake 91 is actuated by the gear shift lever 87 during the transverse portion of its movement in the guide grid 93 before any movement of the sliding gear 83 takes place, as will be explained hereafter.

If for any reason after starting the engine the latter were accelerated to a considerable speed, thus causing the centrifugal clutch 16 of torque converter 17 to be engaged and cause all the members operatively connected thereto, to revolve, it will be readily understood that when the throttle is subsequently released the engine will not be capable of retarding the rotation of all the revolving members below the coupling speed of the centrifugal clutch. As a matter of fact, from this minimum speed the torque converter assembly, due to its considerable force of inertia, might continue to rotate during a relatively long time. The function of brake 91 is therefore to retain the hollow shaft 12 and consequently all the revolving parts connected thereto (notably the gears operatively connected to this shaft) before any movement is imparted to the sliding gear 83, in order to avoid any clashing of gear teeth when engaging a gear.

As shown in FIGS. 4 to 6 of the drawings the shifting of lever 87 to position F in its grid 93 will provide the following sequence of operations:

Applying the brake 91 due to the action exerted on the bell-crank lever 90;

Displacing the sliding gear 83 due to the action exerted on the bell-crank lever 89;

Releasing the brake 91 due to the action exerted by the return spring connected to the bell-crank lever 90.

As an alternative to the brake 91 the following device may be used to advantage since it saves all the mechanical components of this brake.

The transverse movement of gear shift lever 87 in the direction to actuate the bell-crank lever 90 is used only for actuating a switch adapted to de-energize the electromagnetic valve 60 and therefore to clamp the clutch disc 34.

Thus, when the driver wishes to engage the forward drive or the reverse, assuming that the vehicle is stationary and the gear change lever in the neutral (N) position, he cannot effect this change unless he de-energizes the electromagnet valve 60, thus stopping the rotation, if any, of the revolving components of the torque converter and of the gears connected thereto, by braking same in relation to the disc 34 which is stationary as it is rigidly connected to the road wheels.

If desired, a push-button mounted on the gear lever handle may provide this control action instead of the transverse movement of the gear change lever, and in this case a guide grid having a straight slot connecting the N, F and R positions may be used.

When the gear shift lever 87 is in its forward drive position F, the vehicle is ready to start from rest immediately as the driver depresses the accelerator pedal.

As a matter of fact, when the driver opens the throttle in the induction pipe of the engine by depressing the accelerator pedal, the engine is firstly accelerated under no-load conditions until the centrifugal clutch 16 attains its coupling speed; then the engine drives the impeller 20 of the torque converter, thus causing the vehicle to be driven through the medium of the turbine 21 of this torque converter via the hollow shaft 12, gear 75, gear 76, freewheel 77, sleeve 78, sliding gear 83, sleeve 84, shaft 13, differential 15 and the road wheels.

Up to a predetermined speed of the vehicle which is dependent on the permissible accelerator stroke, the operation of the transmission takes place automatically through the component elements cited in the preceding paragraph, by virtue of the known properties of the torque converter.

From and above a certain vehicle speed and for a predetermined position of the accelerator pedal, the inertia weights 52 of regulator 50 cause the push member 53 to engage the antagonistic spring 56, thus opening the micro-switch 54. Thus, the electrical circuit controlling the electromagnetic valve 60 is open and the piston of this valve is moved to the right (as seen in FIG. 3) by the return spring 73.

Under these conditions, it is evident that the pipe line 69 supplying the fluid under pressure communicates with the pipe line 70 of the auxiliary chamber 42, thus causing the disc 34 to be clamped between the plate 35 and piston 36.

During this step, the line leading to the torque converter 17 is disconnected from the pressure fluid circuit except through the small-sectioned passage 71 for two reasons:

Firstly, providing in the chamber 33 of the torque converter a pressure inferior to that obtaining in the auxiliary chamber 42 behind the clutch piston 18;

Secondly, permitting a moderate oil circulation in the converter for lubrication purposes.

In FIG. 1, it is evident that the clamping of the clutch disc 34 causes the shaft 11 to be driven together with gear 85, gear 86, sleeve 84, counter-shaft 13 and therefore the differential gear 15 and the road or drive wheels. This is made possible by the provision of the freewheel device 77 enabling the shaft 13 and sleeves 84, 78 to rotate faster than gear 76. The engine power output is no more transmitted through the torque converter (this feature being particularly advantageous as far as the efficiency of the transmission is concerned), and in addition the engine torque is transmitted to the drive wheels with a higher gear ratio than that provided by the transmission through the torque converter.

The operation of the transmission mechanism in reverse drive conditions does not require any detailed description for it is substantially similar to that described hereinabove with reference to the forward drive utilizing the torque converter. It may be pointed out that a suitable device co-acting with a switch prevents the electromagnetic valve circuit from being opened when the gear change lever 87 is in the reverse (R) position.

On the other hand, the sliding gear 83 carries dog teeth 96 engageable with corresponding dog teeth 97 carried by gear 76 in order to permit the use of the engine as an efficient brake through the considerable reduction ratio afforded by the corresponding train of gears and through the torque converter.

The movement of the sliding gear 83 as a consequence of the shifting of lever 87 from the forward drive position F to the engine braking position EB is attended beforehand by a transverse displacement of this lever which causes the actuation of a bell-crank lever 92 operatively connected to the accelerator control. The purpose of this specific arrangement is to prevent any movement of lever 87 to the engine braking position EB before the engine has been accelerated to a speed sufficient for properly locking the freewheel or like unidirectional drive device 77. Thus, the mutual engagement between the dog teeth 96 of sliding gear 83 and 97 of gear 76 takes place without any clashing and grinding of the teeth.

From FIGS. 4 to 6, it will be seen that the operation of gear change lever 87 along the path formed by the guide grid 93 will provide the following sequence of operations:

Engine acceleration (through bell-crank 92) up to a sufficient speed, independently of the normal action exerted by the driver (as a matter of fact, when the driver uses the engine as a brake, he usually lifts the foot from the accelerator pedal);

Displacement of sliding gear 83 to the right (through bell-crank lever 89);

Release of throttle control due to the action exerted by the return spring associated with the bell-crank lever 92.

The same operations may take place in the reverse sequence during the release of the engine braking action to revert to the forward drive position F. The engine acceleration in this case is useful for reducing the stress transmitted through dog teeth 96 to dog teeth 97 in order to faciliate their release.

According to an arrangement applicable to the use of the engine as a source of auxiliary braking force the movement of the gear change lever 87 to the engine braking position is used for closing through any suitable switch device the contact 98 controlling the energization of the electromagnet valve 60, thus maintaining permanently the conditions of operation through the torque converter.

According to an alternate form of embodiment, a braking action from the engine may be combined with a braking action produced within the hydraulic converter by imparting different speeds to the impeller and to the turbine thereof.

This arrangement is obtained by combining the engagement of the dogs providing the engine braking action (upon completion of this engagement) with the clamping of the clutch disc 38. Under these conditions, the engine is driven through the train of gears 86, 85, the impeller being driven at the same speed. The turbine is driven through the train of gears 76, 75. Thus, its speed is greater than that of the impeller and the stirring of the hydraulic fluid which is thus obtained increases the braking action of the engine.

In this case, the engine braking force should be used for this purpose only with a view to permit the restoring of the normal automatic operation of the transmission when the use of this auxiliary braking force is no more necessary.

FIGS. 7 to 9 of the drawings illustrate another form of embodiment of the invention consisting of a mechanical change-speed gear for a transmission unit according to this invention. The essential purpose of this arrangement is to enable the driver to select among two gear ratios in the transmission path through the torque converter and notably to introduce a very low reduction ratio whenever it is deemed necessary, while preserving the automatic operation as described hereabove.

FIG. 7 shows the intermediate shafts 11, 12 adapted to be driven as in the preceding form of embodiment, and the counter-shaft 13 driving the differential. The shaft 12 connected to the torque converter turbine carries gears 100, 101 and 102.

The gear 100 constituting one element of a first train of forward-drive gears meshes with a gear 103 mounted for free rotation on the counter-shaft 13.

The gear 101 forming an integral part of a second train of forward-drive gears meshes with a gear 104 also mounted for free rotation but on a freewheel rotor 105, the hub 106 of this freewheel being also mounted for loose rotation on the aforesaid counter-shaft 13.

The gear 103 belongs to the reverse gear train comprising an intermediate set of gears or a single gear not shown in the figure.

A sliding gear 107 mounted on splines formed on a sleeve 108 mounted in turn on splines formed on the shaft 13 is adapted to mesh in its endmost position to the right as seen in the figure with an intermediate reverse gear and, in a first position to the left, with dog teeth 109 formed on the freewheel hub through which the engine torque is transmitted from either of the aforesaid forward drive trains of gears.

To this end the freewheel rotor 105 is operatively connected through splines to an external hub 110 having mounted thereon a sliding annulus 111 formed with internal teeth engaging corresponding splines formed on this hub 110.

This sliding annulus 111 may be drivingly connected either to the gear 103 (as shown in the figure) or to the gear 104 (in its endmost position to the right as seen in the figure) by means of the dog teeth of these gears, adequate external control means to be described presently being provided to this end.

Between the dog teeth of gears 103, 104 and the external hub 110 of the sleeve, friction washers 112, 113 having special teeth formed on their outer periphery are interposed to permit the axial sliding movement of the annulus 111 under certain conditions to be set forth presently.

The freewheel rotor 105 is also provided with dog teeth 104 adapted to mesh with corresponding teeth 115 formed on the sliding gear 107.

Disposed between the intermediate shaft 11 and the output shaft 13 is a train of gears 19 consisting of gears 85, 86 wedged on these shafts respectively, as shown. A typical form of embodiment of an external hand control or gear shift arrangement suitable for controlling this gear-change transmission is illustrated diagrammatically in FIG. 8. This arrangement comprises a gear change lever 116 adapted either to cause a tubular shaft 117 to rotate about its axis, or a central rod 118 positioned within the tube 117 to slide along its axis.

The tube 117 is connected by a lever 119 to a cable or like transmission member 120 attached to the fork controlling the axial movements of the sliding gear 107.

The lever 119 is formed with a cam-like projection 121 of which the passage (during a predetermined portion of the angular movement of this lever) under a bell-crank lever 122 causes the longitudinal displacement of a cable 123 connected to the throttle control member.

The central rod 118 is connected through a pivoted bell-crank lever 124 to another cable 125 attached in a proper manner to a fork controlling the movements of the sliding annulus 111.

A grid 126 (FIG. 9) mounted in a suitable fashion materializes the permissible displacements of the gear change lever 116 between six different positions designated as follows in FIGS. 8 and 9:

R=reverse; N=neutral; $F^1$=forward drive with normal reduction ratio; $EB^1$=engine braking effect; $F^2$=forward drive with lower reduction ratio, and $EB^2$=engine braking effect.

The operation of the transmission in this case takes place as follows:

When the driver moves the gear change lever 116 to positions R, N or $F^1$, the transmission operates exactly in the same manner as in the case of the first form of embodiment described hereabove, for it will be noted that during this linear movement of the lever 116 in the grid 126 the sliding annulus 111 is and remains in the position shown in FIG. 7 in which the corresponding positions of sliding gear 107 are also shown.

When the driver shifts the lever 116 to position $EB^1$, during a first portion of the movement the lever 119 operatively connected thereto the engine will be accelerated due to the action exerted by the cam-like projection 121, and during a second portion of this stroke the dog teeth 118 of sliding gear 107 will engage the dog teeth 114 of the freewheel rotor 105.

Under these conditions, the transmission will permit the braking of the vehicle by the engine in the manner already set forth during the description of the operation of the mechanism of the first form of embodiment.

The only difference between the two cases lies in the combined means acting upon the accelerator control and on the dogs for locking the free wheel device.

When the engine torque is thus transmitted through the torque converter and the gear train 100, 103, and if the driver deems the torque available at the road wheels is insufficient he may shift the gear lever 116 from position $F^1$ to position $F^2$ in order to cause the engagement of the pair of gears 101, 104 after the converter in order to provide a gear ratio lower than that obtaining through the couple of gears 100, 103.

To do this it is sufficient to release the throttle. Due to the provision of the free wheel device, the engine is uncoupled from the driving wheels. The movement of the sliding annulus 111 from its dog engagement with pinion 103 to its dog engagement with pinion 104 represents but a moderate difference in speed for the assembly consisting of the annulus 111, hub 110 and free wheel rotor 105 which has a relatively low inertia.

In spite of this low inertia which resists the slight differences in speed occurring in the operation of the assembly when the dog engagement is changed, a simple synchronizing ring 113 has been interposed between the hub 110 and gear 104. This ring, according to the known method, is formed with teeth so placed that when the synchronization between the respective speeds of gear 104 and annulus 111 is not perfect, these teeth are slightly shifted in relation to those of said annulus and counteract its movement towards the dog teeth. Any effort tending to displace the annulus will then apply an axial thrust to the washer. This axial thrust, due to the friction thus developed, causes the speeds of the annulus and gear to be synchronized, thus avoiding the clashing of teeth at their engagement.

A similar device is provided for facilitating the return movement of the annulus 111 in the dog teeth of gear 103 by means of a washer 112 similar to the aforesaid washer 113. This device becomes automatically operative when the driver moves the gear change lever 116 from position $F^2$ to position $F^1$.

From position $F^2$, the driver may shift the lever 116 to position $EB^2$ according to the same sequence of operations as that described in connection with the passage from position $F^1$ to position $EB^1$.

It is one of the interesting features of the mechanical arrangement forming the subject-matter of this invention to permit the operation of the engine as an auxiliary brake when either of the two reduction ratios are interposed in the forward drive between the torque converter and the output shaft. In this case, the arrangements set forth hereinabove in connection with the use of the engine as an auxiliary brake are also effective.

I claim:

1. A motor vehicle transmission comprising a torque converter and a friction clutch, coaxial drive shafts, one of said shafts being connected to said torque converter and the other of said shafts being connected to said friction clutch, a centrifugal clutch for connecting said torque converter and friction clutch to a vehicle engine, a mechanical gear box having coaxial input shafts and a parallel output shaft, coupling means connecting the first mentioned and the last mentioned coaxial shafts together, at least one train of forward gears having a unidirectional coupling for connecting one of said coaxial drive shafts to said output shaft, a train of reverse gears for connecting said one coaxial drive shaft and said output shaft, gear selector means for selectively engaging one of said gear trains, a second train of forward gears connecting said other coaxial drive shaft to said output shaft, said second train of forward gears having a smaller step-down ratio than the first mentioned train of forward gears, and control means for selectively activating and deactivating said torque converter and said friction clutch to effect a shifting of said transmission.

2. The transmission of claim 1 wherein the input and output ends of said gear box are at the same end and said output shaft is connected to a driving axle differential.

3. The transmission of claim 1 wherein said friction clutch is hydraulically controlled and said control means are of the hydraulically operated type and comprise a hydraulic system provided with an electromagnetic valve for controlling the supplying of hydraulic fluid under pressure to said torque converter and said friction clutch, a centrifugal regulator driven from said output shaft, electric control means for said electromagnetic valve responsive to said centrifugal regulator, said centrifugal regulator having a movable member, a resilient member loading said movable member, means connected with a throttle control for the vehicle engine for varying the loading imposed by said resilient member, whereby the transmission of torque from the vehicle engine takes place first through said torque converter and then through said friction clutch.

4. The transmission of claim 1 together with an optional driving path between said one coaxial drive shaft and said output shaft for effecting the braking of the transmission by the vehicle engine, said optional driving path including a sliding gear having dog teeth and adapted to selectively interlock with said unidirectional coupling or by pass said unidirectional coupling, means for effecting the sliding of said sliding gear, control means connected to said last mentioned means for actuation of a throttle control member of a vehicle engine before said sliding gear begins to move in order to facilitate the engagement and subsequently the disengagement of said dog teeth.

5. A motor vehicle transmission comprising a torque converter and a friction clutch, coaxial drive shafts, one of said shafts being connected to said torque converter and the other of said shafts being connected to said friction clutch, a centrifugal clutch for connecting said torque converter and friction clutch to a vehicle engine, a mechanical gear box having coaxial input shafts and a parallel output shaft, coupling means connecting the first mentioned and the last mentioned coaxial shafts together, two trains of forward gears and a unidirectional coupling for connecting one of said coaxial drive shafts to said output shaft, said gear trains including a sliding gear for selectively completing one of said gear trains, a train of reverse gears for connecting said one coaxial drive shaft and said output shaft, gear selector means for selectively engaging one of said gear trains, a second train of forward gears connecting said other coaxial drive shaft to said output shaft, said second train of forward gears having a smaller step-down ratio than the first mentioned train of forward gears, and control means for selectively activating and deactivating said torque converter and said friction clutch to effect a shifting of said transmission.

6. Transmission mechanism as set forth in claim 4, wherein the movement of the aforesaid sliding gear to the position providing the engine braking effect controls means for actuating the electromagnetic valve controlling the distribution of hydraulic fluid in the direction to ensure the transmission of the engine torque through said torque converter.

7. Transmission mechanism as set forth in claim 4, wherein said torque converter includes an impeller and a turbine and wherein the movement of the aforesaid sliding gear to the position providing the engine braking effect controls means for actuating said hydraulically-controlled friction clutch in order to combine the aforesaid engine braking effect proper with the retarding effect resulting from the stirring of the hydraulic fluid in the torque converter which is caused by the different speeds at which the impeller and the turbine of said torque converter revolve in this case.

8. Transmission mechanism as set forth in claim 4, wherein said torque converter includes a turbine and wherein the movement of the aforesaid sliding gear controls means for actuating, between a neutral position and the forward-drive or reverse-drive position, a brake mounted on said one coaxial shaft connected to said turbine, in order to ensure the smooth engagement of said sliding gear with the gear of the corresponding trains.

9. Transmission mechanism as set forth in claim 4, wherein said torque converter includes a turbine and wherein the movement of the sliding gear controls means for actuating, between the neutral position and the forward-drive or reverse-drive position, said fluid-distributing eletromagnetic valve in a direction to supply fluid to said hydraulically-controlled friction clutch, in order to lock a turbine of said torque converter and therefore ensure the smooth engagement of said sliding gear with the gear of the relevant one of said gear trains.

References Cited in the file of this patent
UNITED STATES PATENTS

| | | |
|---|---|---|
| 2,000,605 | Moorhouse | May 7, 1935 |
| 2,038,326 | Wagner | Apr. 21, 1936 |
| 2,105,742 | Lee | Jan. 18, 1938 |
| 2,276,862 | Peterson et al. | Mar. 17, 1942 |
| 2,459,705 | Julien | Jan. 18, 1949 |
| 2,776,572 | Walter | Jan. 8, 1957 |
| 2,844,974 | Saives | July 29, 1958 |
| 2,893,266 | Kelley | July 7, 1959 |